United States Patent
De-Tullio et al.

(10) Patent No.: US 8,763,664 B2
(45) Date of Patent: Jul. 1, 2014

(54) REINFORCEMENT COMPRISING TWO REINFORCING MATERIALS AND TIRE COMPRISING SUCH A REINFORCEMENT

(75) Inventors: Murielle De-Tullio, Clermont-Ferrand (FR); Jean-Marc Viller, Riom (FR)

(73) Assignees: Societe de Technologie Michelin, Clermont-Ferrand (FR); Michelin Recherche et Technique S.A., Granges-Pasccot (CH)

( * ) Notice: Subject to any disclaimer, the term of this patent is extended or adjusted under 35 U.S.C. 154(b) by 284 days.

(21) Appl. No.: 13/319,350

(22) PCT Filed: May 4, 2010

(86) PCT No.: PCT/EP2010/056041
§ 371 (c)(1),
(2), (4) Date: Dec. 14, 2011

(87) PCT Pub. No.: WO2010/130601
PCT Pub. Date: Nov. 18, 2010

(65) Prior Publication Data
US 2012/0103499 A1    May 3, 2012

(30) Foreign Application Priority Data
May 12, 2009  (FR) ...................................... 09 53115

(51) Int. Cl.
*B60C 15/06*    (2006.01)
(52) U.S. Cl.
USPC ............................ 152/543; 152/451; 152/546
(58) Field of Classification Search
USPC .......... 152/451, 539, 543, 552, 541, 542, 546
See application file for complete search history.

(56) References Cited

U.S. PATENT DOCUMENTS 3,719,218 A  *  3/1973  Leybourne, III ............... 152/527
4,074,743 A     2/1978  van der Burg et al.
(Continued)

FOREIGN PATENT DOCUMENTS

DE       3515944     *  11/1986
FR       1 296 859 A    6/1962
(Continued)

OTHER PUBLICATIONS

English machine translation of JP2000-168309, dated Jun. 2000.*

(Continued)

*Primary Examiner* — Justin Fischer
*Assistant Examiner* — Robert Dye
(74) *Attorney, Agent, or Firm* — Dickinson Wright PLLC (57) ABSTRACT

Tire reinforcement (10) having a bi-material structure of reinforcing elements that consists of at least a plurality of extensible first reinforcing elements (1) and at least a plurality of inextensible second reinforcing elements (2), these first and second reinforcing elements being mutually parallel and distributed alternately in appropriate proportions in order to achieve the desired level of reinforcement, these first and second reinforcing elements lying within the same mean plane, this reinforcement being such that the extensible first reinforcing elements (1) are coupled to the inextensible second reinforcing elements (2) over a coupling length Lc which is shorter than the length L1 of the extensible first reinforcing elements (1) so that, with each of the first and second reinforcing elements having two ends, at least one of the ends of the extensible first reinforcing elements (1) is offset in relation to the two ends of the inextensible second reinforcing elements (2).

11 Claims, 4 Drawing Sheets

(56) References Cited

U.S. PATENT DOCUMENTS

| | | |
|---|---|---|
| 5,634,995 A | 6/1997 | Kimura |
| 2007/0006958 A1 | 1/2007 | Wright |
| 2008/0178982 A1 | 7/2008 | Yoshikawa et al. |
| 2008/0190539 A1 | 8/2008 | Ferlin et al. |
| 2009/0114332 A1 | 5/2009 | Daghini et al. |
| 2010/0006201 A1 | 1/2010 | Grisin et al. |
| 2010/0101696 A1 | 4/2010 | Agresti et al. |
| 2010/0108228 A1 | 5/2010 | Cereda et al. |

FOREIGN PATENT DOCUMENTS

| | | | |
|---|---|---|---|
| FR | 1 310 491 A | | 11/1962 |
| FR | 2 291 878 A1 | | 6/1976 |
| FR | 2 882 691 A1 | | 9/2006 |
| FR | 2 912 346 A1 | | 8/2008 |
| GB | 990392 | * | 4/1965 |
| GB | 2063185 | * | 6/1981 |
| JP | 02-225112 | * | 9/1990 |
| JP | 03-169712 | * | 7/1991 |
| JP | 07-117420 | * | 5/1995 |
| JP | 10-151906 A | | 6/1998 |
| JP | 10-314504 A | | 12/1998 |
| JP | 2000-168309 | * | 6/2000 |
| WO | WO 2006/079352 A1 | | 8/2006 |
| WO | WO 2008/074337 A1 | | 6/2008 |
| WO | WO 2008/148407 A1 | | 12/2008 |

OTHER PUBLICATIONS

English machine translation of DE3515944, dated Nov. 1986.*
International Search Report (PCT/ISA/210) issued on Jun. 4, 2010, by European Patent Office as the International Searching Authority for International Application No. PCT/EP2010/056041.

* cited by examiner

REINFORCEMENT COMPRISING TWO REINFORCING MATERIALS AND TIRE COMPRISING SUCH A REINFORCEMENT

The invention relates to a novel reinforcement for reinforcing radial-ply tyres and more particularly tyres intended for moderate or high tonnage vehicles, such as lorries, road tractors, buses, heavy goods vehicles. The invention also relates to a tyre comprising such a reinforcement.

Such tyres generally comprise a carcass reinforcement consisting of at least one rubber-based ply containing metal reinforcing elements running substantially radially, i.e. making of an angle of between 80° and 100° with the circumferential direction, this ply being surmounted radially to the outside by a crown reinforcement composed of at least two plies of metal cords crossed from one ply to the next, making angles of between 10° and 45° with the circumferential direction, said crown reinforcement itself being surmounted by a tread. Furthermore, such tyres comprise sidewalls connecting beads to the tread, each bead being intended to come into contact with a mounting rim. The ends of the carcass reinforcement are anchored around circumferential reinforcing structures of the beads (these structures are called anchoring bead wires) so as to form upturns going partly back up towards the sidewalls.

Furthermore, the beads comprise at least one additional reinforcement for the upturn of the carcass reinforcement, generally located axially to the outside along said upturn. This additional reinforcement is usually reinforced by the presence of a plurality of metallic and/or textile reinforcement elements, these reinforcing elements being, as is known, in the form of cords oriented at a low angle, i.e. between 10° and 30°, to the circumferential direction on the tyre. This additional reinforcement has a radially outward end which is located radially to the outside or to the inside of the end of the upturn of the carcass reinforcement and a radially inward end generally located radially to the inside of a straight line parallel to the rotation axis and passing through the centre of gravity of the meridional cross section of the anchoring bead wire.

In the case of severe rolling conditions, from the point of view of the load borne by the heavy vehicles and/or in the case of rolling conditions that include frequent braking, because of the radial and circumferential deformations of the end of the upturn of the carcass reinforcement, shear deformations in the materials neighbouring said end occur. These deformations cause, apart from a rise in the temperature of the bead, a weakening of the rubber material located around the ends of the reinforcements. This weakening may be manifested in particular by a crack initiator at the end of the upturn of the carcass reinforcement, a crack then propagating towards the radially external end of the additional bead reinforcement and then propagating towards the outside of the tyre thereby forcing the tyre to be removed. This crack or fracture of the rubber material seems to appear all the more rapidly the radially higher the end of the upturn of the carcass reinforcement (i.e. the radially further away it is from the rotation axis). If this end is relatively low, it is more difficult to anchor the carcass reinforcement satisfactorily because of the rise in temperature in the beads caused by the very high temperatures of the braking members that result from repeated braking. This temperature rise in the beads results in a loss of rigidity of the beads and to weakening of the carcass reinforcement anchoring.

Various solutions have been proposed for remedying the deterioration in a radial-ply tyre in the bead zone and more generally at the ends of the reinforcements.

To remedy the delamination in the sidewall regions adjacent to the beads of a radial-ply tyre that result from repeated large-amplitude flexure of the very flexible sidewalls, patent FR 1 310 491 teaches the combined use of natural or artificial textile threads or cords and metal threads or cords that lie in the same plane and are distributed in suitable proportions according to the desired increase in resistance in order to constitute the carcass plies or the crown reinforcement.

For radial-ply tyre covers, the use of reinforcing elements having a bi-material structure, that is to say formed by threads or cords made of different materials lying in the same plane, for example metal and textile threads or cords, it being possible for the neighbouring threads or cords of each pair of a given material to be separated by one or more threads or cords of the second material, is known, especially as reinforcing element of a crown reinforcement according to patent FR 1 296 859 for economy reasons, or according to patent application JP 1998-151906 for improving road-holding when cornering, or else according to application JP 1998-314504 for reducing vibration when a tyre is running flat.

U.S. Pat. No. 5,634,995 describes a radial-ply tyre for a heavy load, the bead of which comprises a first reinforcement formed by a reinforcing ply made of steel cords going right around the bead wire and a second reinforcement reinforced by textile reinforcing elements, this second reinforcement being located axially to the outside of the carcass upturn. The second reinforcement is partly superposed on the first reinforcement so that the axially external end of the first reinforcement is covered by the second reinforcement.

Patent application FR 2 291 878-A discloses, in order to avoid premature deterioration of the bead of a tyre for a heavy vehicle, a reinforcement formed by a single ply comprising a ply portion that is relatively thick in cross section, containing steel reinforcements, this thick ply portion terminating radially to the inside of the end of the upturn of the carcass ply, and a thinner portion that extends the thick ply portion and the radially outermost end of which lies radially beyond the end of the upturn of the carcass ply. This thinner portion contains reinforcements of lower stiffness than the stiffness of the reinforcements of the thick ply portion, for example textile cords. This solution has the drawback of having, on the one hand, one end of the carcass ply upturn that rises relatively high in the bead, which may promote the appearance of a crack at the end of the carcass ply upturn, and, on the other hand, a discontinuity between the two reinforcing materials, which may promote the appearance of a fracture at the junction of the two materials being one along the extension of the other or else overlapping over a short length.

DEFINITIONS

Equatorial plane: the plane perpendicular to the rotation axis and dividing the tread substantially into two parts of equal width.

Radial plane (or meridional plane): a plane containing the rotation axis.

Radial direction: a direction perpendicular to the rotation axis.

Circumferential direction: a direction tangential to a circle centred on the rotation axis.

Axial direction: a direction parallel to the rotation axis of the tyre. A point is said to be axially to the inside of another point whenever its distance from the equatorial plane of the tyre is less than the distance of the other point relative to the same equatorial plane.

A point on a tyre is said to be radially to the inside of another point whenever its distance from the rotation axis of the tyre is less than the distance of the other point relative to said axis.

The term "reinforcing element" is understood to mean both threads and cords. A thread may consist of a single monofilament or multifilament thread while a cord consists of an assembly of at least two threads.

The term "inextensible reinforcing element" is understood here to mean a reinforcing element with zero or almost zero deformation for the usual loads supported in the tyre; these inextensible reinforcing elements may either be of metallic nature, such as a wire or an assembly of several wires.

The term "extensible reinforcing element" is understood here to mean a reinforcing element having an elongation at break of at least 3%. This reinforcing element is chosen especially from the group of reinforcing elements comprising polyester or polyamide reinforcing elements and glass, rayon, polyvinyl alcohol, aromatic polyamide (aramid) or polyketone fibres.

The object of the invention is to improve the endurance of those tyre parts comprising reinforcement ends surrounded by rubber material. In particular, although not exclusively, this invention applies to the beads of a tyre for a heavy goods vehicle and makes it possible to minimize the radial and circumferential deformations undergone by the rubber materials at the ends of the bead reinforcements (carcass reinforcement and/or additional reinforcements).

For this purpose, the invention provides a reinforcement that can be used as a tyre reinforcement, this reinforcement having a bi-material structure of reinforcing elements that consists of at least a plurality of extensible first reinforcing elements and at least a plurality of inextensible second reinforcement elements. These first and second reinforcing elements are mutually parallel and distributed alternately in appropriate proportions in order to achieve the desired level of reinforcement, these first and second reinforcing elements lying within the same mean plane (or substantially the same mean plane). The extensible first reinforcing elements are coupled to the inextensible second reinforcing elements over a coupling length Lc which is shorter than the length L1 of the extensible first reinforcing elements so that, with each of the first and second reinforcing elements having two ends, at least one of the ends of the first reinforcing elements is offset in relation to the two ends of the second reinforcing elements.

In what follows, it should be understood that a bi-material reinforcement or structure of reinforcing elements is formed by at least a plurality of extensible first reinforcing elements and at least a plurality of inextensible second reinforcing elements, these first and second reinforcing elements being embedded in at least one rubber-based material.

Preferably, the difference between the lengths of the extensible first reinforcing elements and the coupling length between the first and second reinforcing elements of the reinforcement according to the invention is at least 15 mm.

Advantageously, the tyre reinforcement according to the invention is such that the angle of the second reinforcing elements in the coupling part is between 15° and 45° and the angle of the extensible first reinforcing elements in the part where there is no coupling between the first and second reinforcing elements is at least 75°, these angles being taken relative to the direction of greatest dimension of the reinforcement. Preferably, the difference between the angle B of the extensible first reinforcing elements in the part where there is no coupling between the first and second reinforcing elements and the angle A of the reinforcing elements in the coupling part is at most 60°.

According to one particularly advantageous use of the bi-material reinforcement in accordance with the invention, the latter is employed as reinforcement for a tyre bead. In this use, a tyre comprises a radial carcass reinforcement consisting of at least one rubberized ply containing inextensible reinforcing elements extending radially and surmounted by a crown reinforcement composed of at least two plies of metal cords crossed from one ply to the next, which is itself surmounted by a tread, sidewalls connecting the base of the bead heels to the tread, each bead having at least a circumferential reinforcement structure (for example of the bead wire type) around which the carcass reinforcement is wound so as to form an upturn, and at least one additional reinforcement. This tyre is characterized in that the additional reinforcement has a bi-material structure formed by a plurality of extensible first reinforcing elements and a plurality of inextensible second reinforcing elements, which are distributed alternately and in appropriate proportions according to the desired level of reinforcement, these first and second reinforcing elements lying substantially within the same mean plane and being mutually parallel, the extensible first reinforcing elements being coupled to the inextensible second reinforcing elements over a coupling part having a length Lc (called the coupling length) which is shorter than the length L1 of the extensible first reinforcing elements so that, with each of the first and second reinforcing elements having two ends, at least one of the ends of the extensible first reinforcing elements is offset in relation to the two ends of the inextensible second reinforcing elements.

Preferably, the radially outermost end corresponds to one of the ends of the extensible reinforcing elements.

The term "coupling part", for coupling between the first and second reinforcing elements, should be understood to mean that part of the reinforcement in which said first and second reinforcing elements are present alternately over the same mean plane.

Advantageously, the bi-material reinforcement used as bead reinforcement of a tyre is such that the angle of inclination of the extensible reinforcing elements, in the part with no coupling between the first and second reinforcing elements, is different from the angle of inclination of the reinforcing elements in the coupling part. When the angle of the extensible reinforcing elements in this coupling part approaches or is equal to 90° to the circumferential direction, it is possible to increase the lateral rigidity of the corresponding part of the tyre and for there to be cooperation with the reinforcing elements of the carcass reinforcement so as in particular to reduce the forces in said carcass reinforcement.

Preferably, the heavy vehicle tyre is such that the radially outermost end of the extensible first reinforcing elements of the additional reinforcement is, in a radial plane of section, at a greater distance from the rotation axis than the distance of the end of the carcass reinforcement upturn relative to the same rotation axis, the radially outermost end of the inextensible reinforcing elements being at a shorter distance from the rotation axis than that separating the end of the upturn from the same axis.

In one embodiment of the tyre according to the invention, the extensible first reinforcing elements extend radially on either side of the inextensible second reinforcing elements, the radially innermost part of the first reinforcing elements being at least partly engaged radially to the inside relative to the bead wire.

The above tyre embodiment may also be improved by ensuring that the extensible first reinforcing elements in the parts extending radially to the inside and to the outside, respectively, of the inextensible second reinforcing elements are mutually parallel and extend in the same direction and at an angle different from that of the second reinforcing elements.

To further increase the endurance of the beads of a heavy vehicle tyre, it is advantageous for each bead to include a second bi-material additional reinforcement, the reinforcing elements of the two additional reinforcements being crossed with each other at least over the coupling part of the first and second reinforcing elements of each reinforcement. In this embodiment, the radially outermost ends of the extensible first reinforcing elements of each of the additional reinforcements are located radially at a higher level than that of the radially upper ends of the second reinforcing elements of each reinforcement.

In another preferred embodiment, the bi-material reinforcement is employed as carcass reinforcement of a tyre, it being possible for this embodiment to be combined with the embodiment in which the additional reinforcement comprises extensible first reinforcing elements and inextensible second reinforcing elements.

In another application of a bi-material reinforcement according to the invention, it is also advantageous to provide at least one crown reinforcement of the tyre.

It is advantageous for the various ends of the reinforcing elements of the carcass reinforcement and of the additional reinforcements all to be offset one with respect to another in the tyre.

The research studies undertaken by the Applicants lead to the conclusion that a bi-material reinforcement consisting of reinforcing elements according to the invention, i.e. having no discontinuity or superposition between the reinforcing elements in the thickness of the reinforcement, makes it possible for the risk of degrading the rubber material located at the end of the bi-material reinforcement to be significantly reduced. Consequently, it is possible to retard the propagation of a crack towards the outside of the bead and therefore to improve the endurance of the beads (i.e. the distance travelled by the tyre) thus constructed.

Furthermore, the very construction of the bi-material reinforcement makes it possible, for a given performance, to save on material and therefore to achieve a weight saving.

The inextensible reinforcing elements and the extensible reinforcing elements making up a bi-material reinforcement according to the invention are preferably sheathed, i.e. covered with a small thickness of rubber material. These inextensible and extensible reinforcing elements in one and the same reinforcement may alternate unitarily or in groups of two or more, in suitable proportions, depending on the desired level of reinforcement. Thus, to give an example, a wire may alternate with a group of three textile threads or a group of two wires may alternate with a textile thread.

In one preferred embodiment, the invention applies to tyres in which the ratio of the on-rim height to its maximum axial width is at most 0.90.

According to a preferred embodiment of the invention, each tyre bead comprises two bi-material additional reinforcements, each of said reinforcements being formed by first and second reinforcing elements arranged alternately and lying substantially within the same mean plane, oriented in the same direction and mutually parallel, the reinforcing elements of the two bi-material additional reinforcements being crossed with each other, preferably symmetrically (i.e. the bisector of the angle made by the crossed reinforcing elements is substantially contained in a plane passing through the rotation axis).

The presence of two additional reinforcements according to the invention is particularly beneficial for the rolling endurance of the beads under a large overload and with frequent or severe braking.

According to a further variant of the various embodiments described above of the bead reinforcement comprising one or two bi-material additional reinforcements, the bead further includes, axially between the one or two bi-material additional reinforcements and the upturn of the carcass reinforcement, an additional reinforcement strengthened by mutually parallel, continuous or discontinuous, metal reinforcing elements in a rubber ply that make an angle equal to or close to 0° with the circumferential direction (i.e. tangents to circles centred on the rotation axis).

A bi-material reinforcement according to the invention, formed by extensible first reinforcing elements and inextensible second reinforcing elements arranged alternately and lying within the same mean plane, these first and second reinforcing elements being oriented in the same direction, may be obtained in a manner known per se by one or other of the processes described below.

In one method of production, a fabric comprising metallic reinforcing elements (corresponding to the second reinforcement elements), which are preferably sheathed and placed on an unvulcanized or prevulcanized layer of rubber normally used for the calendaring of plies, is produced. In addition, a fabric comprising textile reinforcing elements (corresponding to the first reinforcing elements), these being preferably sheathed and placed on an identical layer of rubber normally used for the calendaring of plies, is produced separately and then the two fabrics are superposed so as to place the textile reinforcing elements alternately, i.e. so as to be interspersed, with the metallic reinforcing elements in order to produce the reinforcement comprising the two reinforcing elements lying substantially within the same mean plane. Once superposed, the combination of the two reinforcing elements is compressed, forcing the first reinforcing elements to be intercalated between the second reinforcing elements.

According to another method of production, a straight thread fabric is produced by supplying textile and metallic reinforcing elements, and then two cuts are made into this fabric: a first cut over its entire width at an angle corresponding to the angle of inclination of the reinforcing elements in the reinforcement and a second cut which is zigzag so as to generate longer lengths of textile reinforcing elements than the lengths of metallic reinforcing elements. After having obtained ply portions, they are assembled so as to obtain a reinforcement according to the invention.

Other features and advantages of the invention will become apparent from the description given below with reference to the appended drawings which show, by way of nonlimiting examples, embodiments of the invention.

To make the figures and the associated description easier to read, the same references are used to denote identical structural elements whatever the embodiment in question.

Figure 1:
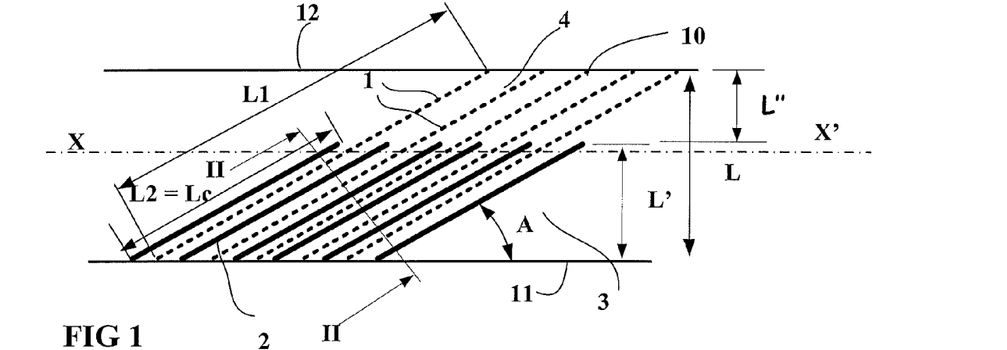
FIGS. 1 to 6 show embodiments of tyre reinforcements according to the invention.

FIG. 1 is a schematic plan view of a reinforcement 10 according to the invention, this reinforcement of width L having two edges 11 and 12. This reinforcement 10 comprises, embedded in a rubber-based material, a plurality of two reinforcing elements, namely textile extensible first reinforcing elements 1 alternating with inextensible metallic second reinforcing elements 2 so as to form, over a length Lc of less than the total length L of the reinforcement, a coupling part 3, these extensible and inextensible reinforcing elements lying, in this coupling part 3, substantially in the same mean plane and inclined in the reinforcement 10 at an angle A to the longest direction of the reinforcement (identified in FIG. 1 by the axis XX'). The inextensible metallic reinforcing elements 2 have a length L2 and the textile extensible reinforcing elements 1 have a length L1 greater than the length L2 of the metallic reinforcing elements. In this embodiment, the metallic and textile reinforcing elements have a common end located on one edge 11 of the reinforcement. Only the textile reinforcing elements 1 extend as far as the other edge 12 of the reinforcement 10 in a part 4, supplementing the reinforcement, beyond the coupling part 3, and having a reinforcement width L" equal to the difference between L and L'. In the case presented, the coupling length, for coupling between the extensible and inextensible reinforcing elements, is here equal to the length L2 of the inextensible reinforcing elements. This coupling length could be reduced, but it must however remain greater than 50% of the length of the inextensible reinforcing elements 2.

Figure 2:
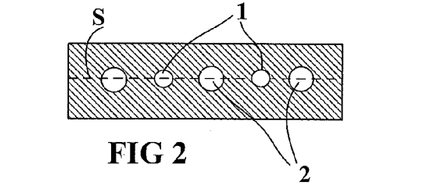

In FIG. 2, showing a cross section of the reinforcement 10 on the line II-II in FIG. 1, it may be seen that the textile reinforcing elements 1 and metallic reinforcing elements 2 are arranged alternately (one for one) in the same mean plane S.

Figures 3, 4:
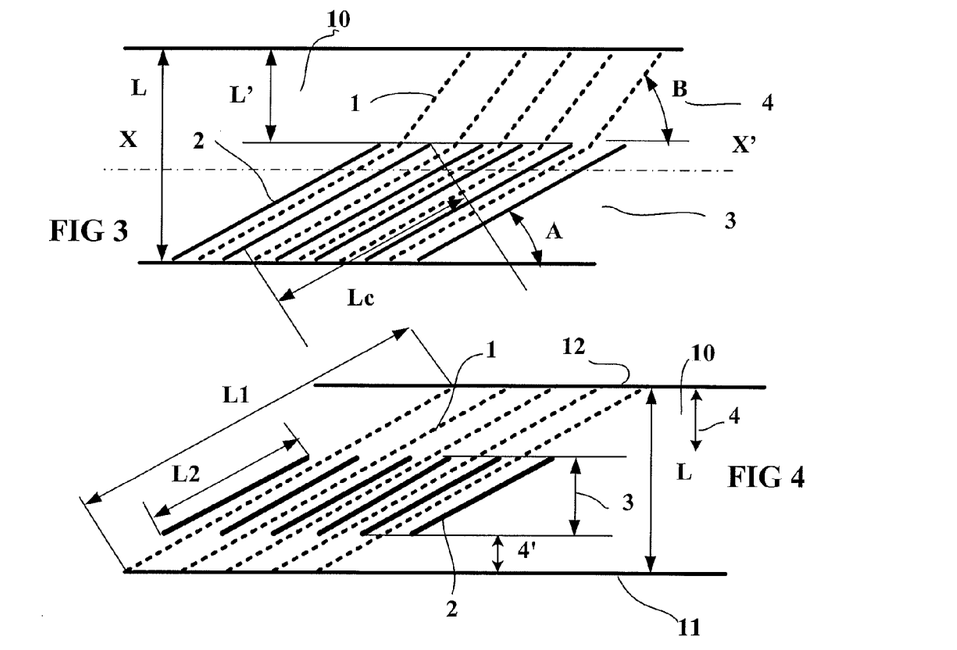

FIG. 3 is a schematic view of a reinforcement 10 of width L according to the invention, similar to the reinforcement shown in FIG. 1, the sole difference being that, in the part 4 of the reinforcement of width L" where only the textile extensible reinforcing elements 1 are present, the angle B of said reinforcing elements is different from the angle A made by the metallic reinforcing elements 2 and textile reinforcing elements 1 in the coupling part 3 of width L'. Because of these different angles of inclination, it is possible to modify the flexural rigidity around the axis XX' of the part 4 where only the extensible reinforcing elements are present. By orienting the extensible reinforcing elements 1 further in a direction perpendicular to the direction XX', it is possible to increase this flexural rigidity of the part 4 of the reinforcement where only the extensible reinforcing elements are present.

FIG. 4 is a plan view of an embodiment according to the invention of a reinforcement 10 similar to the reinforcement described with the aid of FIG. 1, but in which the extensible reinforcing elements 1 extend on either side of the inextensible reinforcing elements 2 as far as the edges 11 and 12 of said reinforcement. In this case, there is a coupling part 3, for coupling the extensible reinforcing elements 1 and the inextensible reinforcing elements 2, which is flanked by parts 4 and 4' comprising only extensible reinforcing elements. In the embodiment shown in FIG. 4, the angles of inclination of the extensible and inextensible reinforcing elements are the same.

Figure 5:
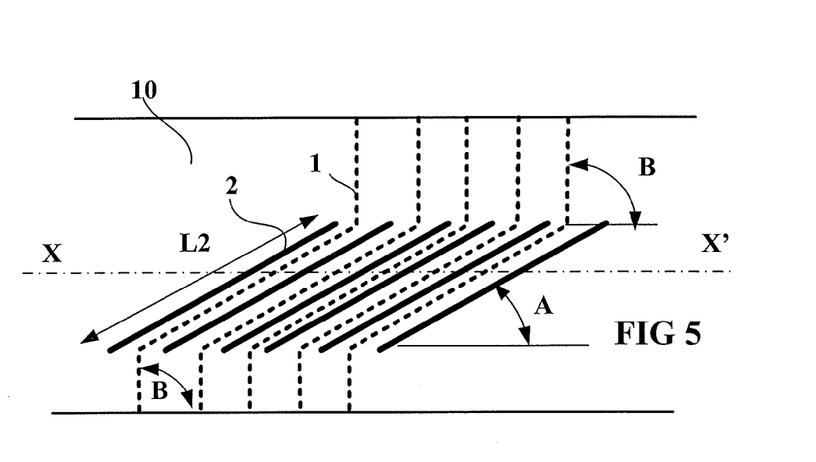

FIG. 5 is a plan view of another embodiment of a reinforcement 10 according to the invention similar to the reinforcement shown in FIG. 4 but in which, in the non-coupling parts 4 and 4', the extensible reinforcing elements 2 make an angle B of 90° to the direction XX' of greatest dimension of said reinforcement, whereas the reinforcing elements in the coupling part make an angle A different from 90° to the direction XX'. In the present case, the angle A is between 20° and 50°. This angle A may be constant over the entire coupling part or else may vary.

Figure 6:
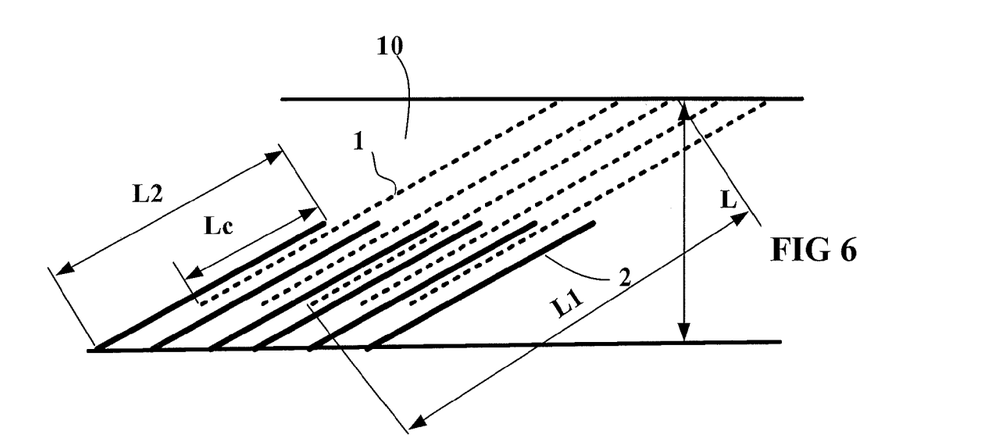

FIG. 6 shows another embodiment of a reinforcement 10 according to the invention in which the coupling length Lc for coupling between the metallic reinforcing elements 2 and the textile reinforcing elements 1 is shorter than the length L1 of the metallic reinforcing elements. In this embodiment, only the ends of the metallic reinforcing elements 2 are located on one edge 11 of the reinforcement, while only the ends of the textile reinforcing elements 1 are located on the other edge 12 of the reinforcement.

Figure 7:
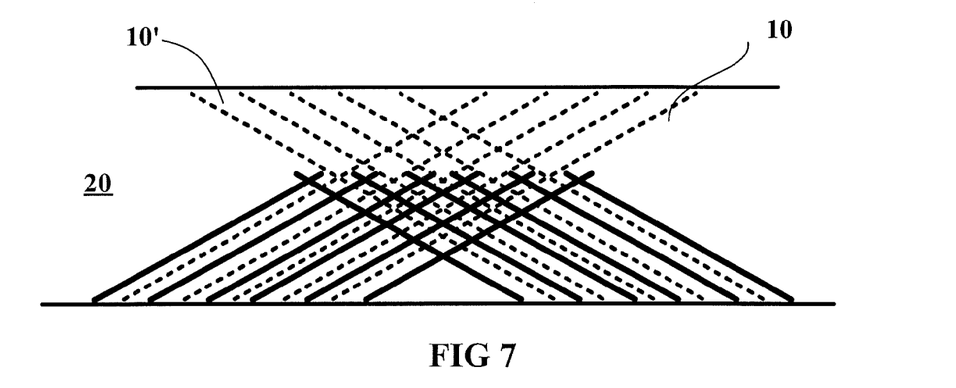
FIG. 7 shows a tyre reinforcement structure comprising two reinforcements according to the invention.

FIG. 7 is a view of a reinforcement 20 formed by the superposition of two identical reinforcements 10 and 10' according to the invention, each corresponding to the reinforcement shown in FIGS. 1 and 2, said two reinforcements being superposed one on the other so that the first and second reinforcing elements of one reinforcement are crossed with the first and second reinforcing elements of the other reinforcement. In the present case, the ends of the two superposed reinforcements are positioned so as to coincide in the width of the reinforcement 20. Thus, the ends of the extensible reinforcing elements of said superposed reinforcements are located at the same point in the width of the reinforcement. In an embodiment not shown, this superposition of two (or more) bi-material reinforcements may be carried out so that the ends of the inextensible reinforcing elements are offset at least at one of their ends so as to attenuate the rigidity discontinuities.

Figure 8:
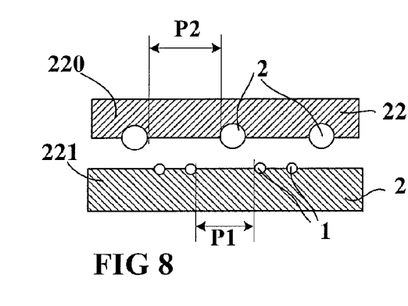
FIG. 8 shows a first method of obtaining a reinforcement according to the invention.

FIG. 8 is a cross-sectional view of two plies 21, 22 before assembly to form a reinforcement 10 according to the invention. A first ply 21 is formed from a plurality of groups of two textile extensible cords 1 partially embedded in rubber material 210. A second ply 22 comprises a layer of rubber material 220, of the same type as that of the first ply 21, in which is embedded only part of the cross section of a plurality of metallic inextensible cords 2 placed so as to be parallel to the same direction and with an appropriate inter-cord distance P2 so as to enable two textile cords 1 of the first ply 21 to be interposed between each pair of metal cords 2 (these textile cords being separated, from one to the next, by a likewise appropriate distance P1). By pressing the first and second plies 21 and 22 against each other, a reinforcement according to the invention comprising alternating metallic and textile reinforcing elements lying substantially within the same mean plane is obtained. To produce the reinforcement according to the invention, the second ply extends in the direction of the cords beyond the end of the metallic cords 1 over an appropriate length and on at least one side.

Figure 9:
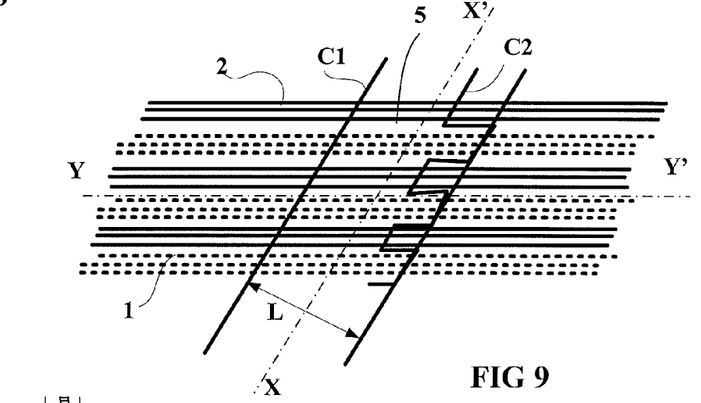
FIG. 9 shows a second method of obtaining a reinforcement according to the invention.

FIG. 9 shows a view of a reinforcing fabric produced by calendaring a plurality of metallic reinforcing elements 2 and textile reinforcing elements 1 oriented parallel to the same direction YY'. The alternation in the coupling region, for coupling the metallic and textile reinforcing elements, is, in the present case, formed by three metallic reinforcing elements flanked by three textile reinforcing elements, but of course any other alternation (especially different numbers of reinforcing elements of each type) may be chosen by a person skilled in the art according to the application of the reinforcements. After a ply in which the reinforcing elements are oriented along the longest direction (identified in the figure by the axis YY') has been obtained, an oblique first cut C1 across all of the reinforcing elements is made along a direction making angle A to the direction YY' and a second cut C2 is made along a line forming a zigzag so that the textile reinforcing elements 1 are of greater length than the metallic reinforcing elements 2 so as to form a portion 5 of width L corresponding to the width of the reinforcement according to the invention. By joining together several portions thus prepared, a reinforcement according to the invention is produced in which the metallic and textile reinforcing elements are inclined at an angle A to the longest direction of said reinforcement (identified by the axis XX' in FIG. 9).

Figure 10:
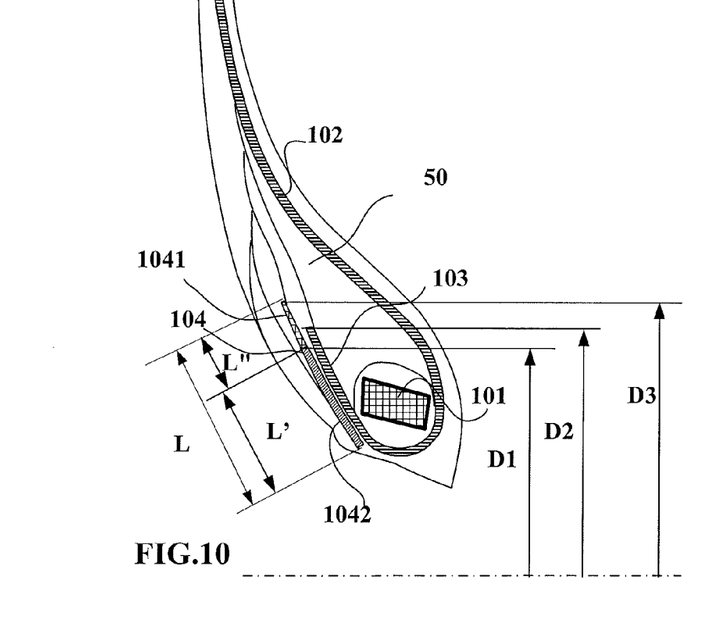
FIG. 10 shows a radial cross section through a heavy-vehicle tyre bead comprising a reinforcement according to the invention.

FIG. 10 shows a tyre bead according to the invention for a heavy vehicle tyre of 315/80 R22.5 size intended to be fitted onto a rim having rim seats inclined at 15°. This tyre comprises a tread (not shown) joined to two beads 50 via two sidewalls. Each bead comprises a bead wire 101 constituting a circumferential reinforcement of said bead around which is wound a carcass reinforcement 102 formed by a ply of metallic cords so as to form an upturn 103. This bead includes, axially to be outside of the upturn 103 of the carcass reinforcement 102, a reinforcement 104 according to the invention, this additional reinforcement, of total width L, has a bi-material structure formed by a plurality of extensible first reinforcement elements and a plurality of inextensible second reinforcing elements. This reinforcement corresponds substantially to the reinforcement described with the aid of FIGS. 1 and 2.

Here the extensible first reinforcing elements are textile cords made of nylon-6,6 with a 400×400 twist and the inextensible second reinforcing elements are what are called "elastic" metallic cords consisting of 6 wires of 0.35 mm diameter, these cords having a force-elongation curve having a first part of low slope (relatively large elongation under low load).

The total width L of the reinforcement 104 here is equal to 70 mm. The inextensible reinforcing elements and the extensible reinforcing elements are mechanically coupled to one another over a coupling part 1042 of width L', equal here to 45 mm. Only the extensible reinforcing elements are present over an end part 1041 of length L" (equal to 25 mm). This end part 1041 lies in the tyre radially to the outside of the coupling part 1042. The angle of the reinforcing elements of the reinforcement 104 to the circumferential direction perpendicular to the plane of the figure is between 20° and 25° on the tyre.

The first and second reinforcing elements are distributed, in the coupling part 1042, alternately and in appropriate proportions so as to achieve the desired level of reinforcement, these first and second reinforcing elements lying substantially in the same mean plane, oriented in the same direction and mutually parallel over at least the length of common juxtaposition of the first and second reinforcing elements. The rubber materials used for this embodiment according to the invention are identical to those used for a tyre of the same size according to the prior art.

The radially external ends of the extensible and inextensible reinforcing elements are staggered so that the end of the carcass upturn is at a distance D2 from the rotation axis of the tyre lying between the distances D1 and D3 of the inextensible and extensible reinforcing elements respectively of the bead reinforcement.

By virtue of this reinforcement, it is possible for the loads at the ends to be better distributed and for the fatigue endurance performance of the tyre beads under rolling conditions to be increased.

Tyres comprising beads according to the invention as described in FIG. 10 were compared with reference tyres having a comparable structure with the exception of the reinforcement, which was a single-material reinforcement from the reinforcing standpoint (identical to the metallic reinforcing element of the reinforcement of the tyre according to the invention).

A comparison was made in two tests for measuring the endurance of heavy vehicle tyre beads, namely a test in which the rolling endurance under a high overload was measured and a test in which the heating endurance of the beads, representative of repeated braking manoeuvres, was measured. Under identical rolling conditions for all the tyres tested, the tyres according to the invention achieved greater mileages than that of the reference tyres.

Figures 11, 12, 13:
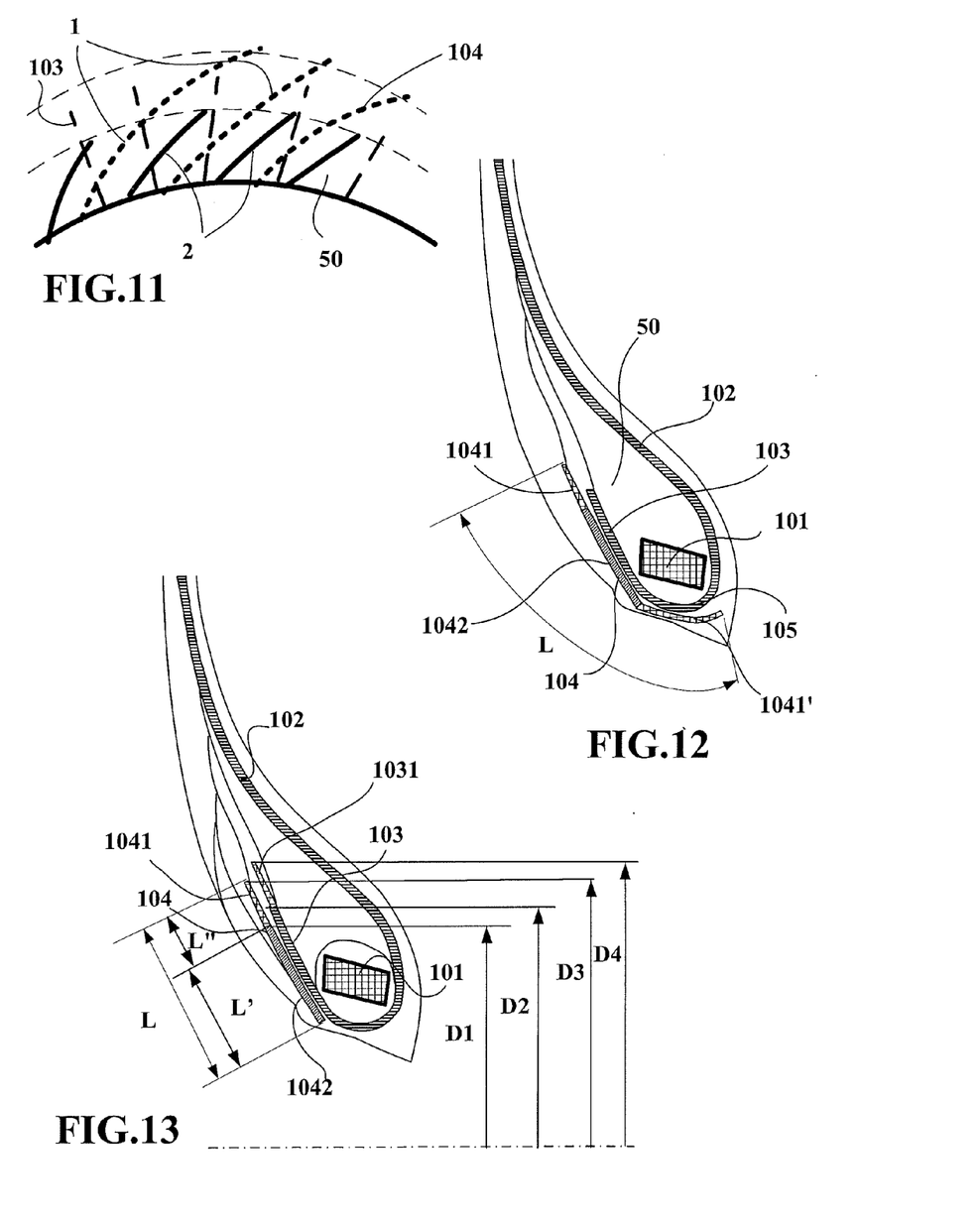
FIG. 11 shows a schematic plan view of part of the bead shown in FIG. 10.
FIG. 12 shows a radial cross section through a heavy-vehicle tyre bead comprising a reinforcement according to a variant of the invention.
FIG. 13 shows a cross section through a bead of a tyre in which the carcass reinforcement is formed by a reinforcement according to the invention and the additional bead reinforcement.

FIG. 11 shows a plan view of part of the bead 50 shown in FIG. 10. In FIG. 11, it may be seen that the additional reinforcement 104 comprises extensible reinforcing elements 1 and inextensible reinforcing elements 2, the radially external end of said reinforcement being formed by the ends of the extensible reinforcing elements 1.

FIG. 12 shows in cross section a view of a tyre bead 50 comprising a reinforcement 104 according to the invention which is placed axially to the outside of the upturn 103 of the carcass reinforcement 102, said reinforcement 104 having a width L measured in the plane of the figure. This bead has the same structure as that shown in FIG. 10, the sole difference being that the reinforcement 104 is extended radially towards the inside of the part 105 of the carcass reinforcement 102 passing radially to the inside relative to the bead wire 101. More precisely, the reinforcement 104 comprises an extension part 1041' reinforced only by the extensible reinforcing elements. Moreover, the extensible first reinforcing elements (1) in the parts 1041 and 1041', extending radially towards the outside and towards the inside of the inextensible second reinforcing elements respectively, are mutually parallel and extend in the same direction and at an angle different from that of the reinforcing elements in the coupling part.

This solution is particularly advantageous since it makes it possible to increase the mechanical integrity of the tyre without correspondingly degrading the mechanical integrity of the ends of the reinforcement 104.

FIG. 13 shows a tyre bead corresponding to an embodiment in which the carcass reinforcement 102 and the bead reinforcement 104 axially to the outside of the upturn 103 of the carcass reinforcement are each a bi-material reinforcement according to the invention. The carcass reinforcement 102 is formed by a plurality of extensible reinforcing elements and inextensible reinforcing elements in appropriate proportions, these reinforcing elements lying substantially in the same mean plane. Furthermore, the extensible reinforcing elements extend in the upturn 103 radially beyond the inextensible reinforcing elements so as to form an end part 1031. The coupling length of the extensible and inextensible reinforcing elements of the carcass reinforcement is equal here to the length of the inextensible reinforcing elements (according to an embodiment not shown, this coupling length could be shorter).

Advantageously and as shown here, the radially outermost ends of the inextensible and extensible reinforcing elements of the carcass reinforcement are at respective distances D2 and D4 from the rotation axis of the tyre. Likewise, the radially outermost ends of the inextensible and extensible reinforcing elements of the additional bead reinforcement are at respective distances D1 and D3 from the rotation axis of the tyre. These ends of the carcass reinforcement and of the additional reinforcement are staggered so that: D1<D2<D3<D4.

Of course, a single-material additional bead reinforcement may be combined with a bi-material carcass reinforcement according to the invention.

The invention is not limited to the examples described and shown, and various modifications may be made thereto without departing from the scope thereof. This type of reinforcement may be used as any reinforcement of a tyre and especially for reinforcing tyre crowns.

The invention claimed is:

1. A tire bead reinforcement having a bi-material structure comprising:
   reinforcing elements that consist of two types:
      a plurality of extensible first reinforcing elements each having a length L1 and a first end disposed on a first side of the bi-material structure and a second end disposed on a second side of the bi-material structure, and
      a plurality of inextensible second reinforcing elements each having a first end disposed on the first side of the bi-material structure and a second end disposed on a second side of the bi-material structure,
   wherein the first and second reinforcing elements are mutually parallel and distributed alternately in appropriate proportions in order to achieve a desired level of reinforcement,
   wherein the first and second reinforcing elements lie within the same mean plane, wherein the extensible first reinforcing elements are coupled to the inextensible second reinforcing elements over a coupling length Lc which is shorter than the length L1 of the extensible first reinforcing elements,
   whereby each of the first ends of the extensible first reinforcing elements is offset in relation to each of the first ends of the inextensible second reinforcing elements or each of the second ends of the extensible first reinforcing elements is offset in relation to each of the second ends of the inextensible second reinforcing elements, or both.

2. The tire reinforcement according to claim 1, wherein the offset between an end of the extensible first reinforcing elements and an end of the second reinforcing elements is at least 15 mm.

3. The tire reinforcement according to claim 1, wherein an angle of inclination B of the extensible first reinforcing elements in part of the tire reinforcement where there is no coupling between the first and second reinforcing elements is different from an angle of inclination A of the reinforcing elements in a part of the tire reinforcement where there is coupling, wherein these angles are taken relative to the direction of greatest dimension of the reinforcement.

4. The tire reinforcement according to claim 3, wherein the difference between the angles of inclination B of the extensible first reinforcing elements in the part of the tire reinforcement where there is no coupling between the first and second reinforcing elements and the angle of inclination A of the reinforcing elements in the part of the tire reinforcement where there is coupling is at most 60°.

5. The tire reinforcement according to claim 1, wherein the coupling length Lc is shorter than the length of the inextensible reinforcing elements.

6. A tire comprising at least one reinforcement consisting of a plurality of reinforcing elements as defined in claim 1.

7. A tire for a vehicle carrying heavy loads, comprising:
   a radial carcass reinforcement consisting of at least one rubberized ply containing reinforcing elements extending radially,
   a pair of beads, each bead comprising:
      at least one circumferential reinforcement around which the carcass reinforcement is partly wound so as to form an upturn, and
      at least one additional tire bead reinforcement having a bi-material structure formed by:
         a plurality of extensible first reinforcing elements, each having a length L1 and a first end disposed on a first side of the bi-material structure and a second end disposed on a second side of the bi-material structure, and
         a plurality of inextensible second reinforcing elements, each having a first end disposed on a first side of the bi-material structure and a second end disposed on a second side of the bi-material structure,
   wherein the first and second reinforcing elements are distributed alternately and in appropriate proportions in order to achieve a desired level of reinforcement,
   wherein the first and second reinforcing elements lie substantially in the same mean plane and are mutually parallel,
   wherein the extensible first reinforcing elements are coupled to the inextensible second reinforcing elements in a coupling part of the additional reinforcement having a length Lc which is shorter than the length L1 of the extensible first reinforcing elements,
   whereby each of the first ends of the extensible first reinforcing elements is offset in relation to each of the first ends of the inextensible second reinforcing elements, or each of the second ends of the extensible first reinforcing elements is offset in relation to each of the second ends of the inextensible second reinforcing elements, or both.

8. The tire according to claim 7, wherein radially outermost end of the additional reinforcement corresponds to an end of the extensible first reinforcing elements.

9. The tire according to claim 8, wherein the radially outermost end of the extensible first reinforcing elements is, in a radial plane of section, at a distance D3 from a rotation axis which is greater than a distance D2 of the end of the carcass reinforcement upturn relative to the same rotation axis.

10. The tire according to claim 7, wherein the extensible first reinforcing elements extend radially on either side of the inextensible second reinforcing elements, and wherein a radially innermost part of the first reinforcing elements is at least partly extended radially towards apart of the carcass reinforcement passing radially to the inside of the circumferential reinforcement.

11. The tire according to claim 7, wherein parts of the extensible first reinforcing elements extend radially towards the outside and towards the inside, respectively, of the inextensible second reinforcing elements, and wherein these parts extend in the same direction but at a different angle from the angle of the reinforcing elements in the coupling part.

* * * * *